(12) United States Patent  (10) Patent No.: US 8,373,819 B2
Lee et al.  (45) Date of Patent: Feb. 12, 2013

(54) BACKLIGHT UNIT AND LIQUID CRYSTAL DISPLAY DEVICE HAVING THE SAME

(75) Inventors: Joo Hong Lee, Seoul (KR); Hong Sung Song, Gumi-si (KR); Seok Hwan Oh, Gumi-si (KR); Woong Ki Min, Daegu (KR); Ji Woon Min, Gumi-si (KR)

(73) Assignee: LG. Display Co. Ltd., Seoul (KR)

( * ) Notice: Subject to any disclaimer, the term of this patent is extended or adjusted under 35 U.S.C. 154(b) by 543 days.

(21) Appl. No.: 12/629,442

(22) Filed: Dec. 2, 2009

(65) Prior Publication Data

US 2010/0157196 A1 Jun. 24, 2010

(30) Foreign Application Priority Data

Dec. 19, 2008 (KR) ........................ 10-2008-0130013

(51) Int. Cl.
*G02F 1/1333* (2006.01)
*G02F 1/1335* (2006.01)

(52) U.S. Cl. ............................... 349/62; 349/58; 349/65

(58) Field of Classification Search .............. 349/58–62; 362/97.2
See application file for complete search history.

(56) References Cited

U.S. PATENT DOCUMENTS

| 6,388,722 | B1 * | 5/2002 | Yoshii et al. | 349/62 |
| 7,602,458 | B2 * | 10/2009 | Mishima et al. | 349/58 |
| 8,023,067 | B2 * | 9/2011 | Moon et al. | 349/64 |
| 2011/0109844 | A1 * | 5/2011 | Go et al. | 349/65 |
| 2011/0304796 | A1 * | 12/2011 | Lee et al. | 349/62 |
| 2012/0224119 | A1 * | 9/2012 | Cho et al. | 349/61 |

FOREIGN PATENT DOCUMENTS

JP 2002-015885 1/2002
KR 1020080086274 A 9/2008

OTHER PUBLICATIONS

Office Action issued in corresponding Korean Patent Application No. 10-2008-0130013, mailed Sep. 21, 2012.

* cited by examiner

*Primary Examiner* — Huyen Ngo

(74) *Attorney, Agent, or Firm* — Brinks Hofer Gilson & Lione

(57) ABSTRACT

A backlight unit capable of preventing an initial driving malfunction is disclosed. The backlight unit includes a bottom cover opened upwardly, a reflective sheet disposed in the inner surface of the bottom cover; a plurality of lamps arranged at a fixed interval on the reflective sheet; an auxiliary light source disposed at the outer side surface of the bottom cover; and a light guide member, opposite to the emitting surface of the auxiliary light source, configured to guide light emitted from the auxiliary light source to the lamps through first and second penetration holes formed on one of the side walls of the bottom cover and the reflective sheet.

2 Claims, 4 Drawing Sheets

FIG. 4
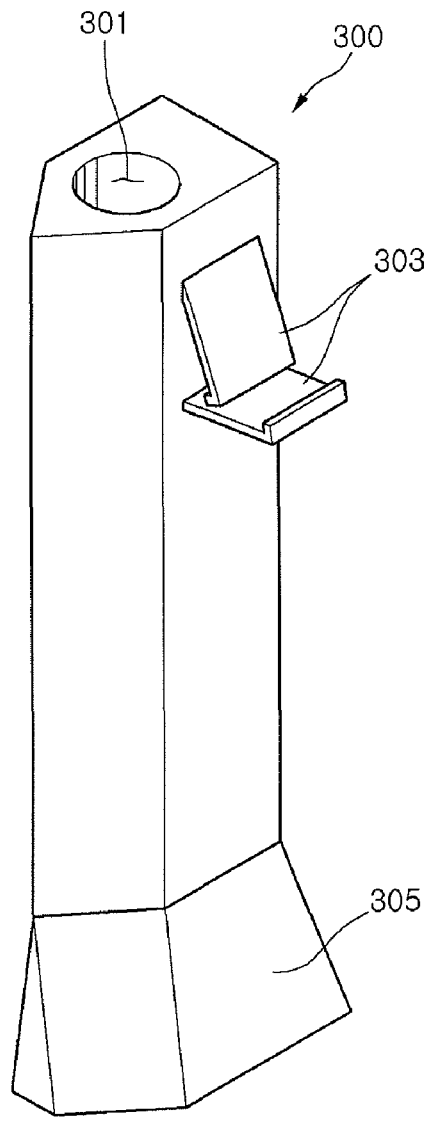
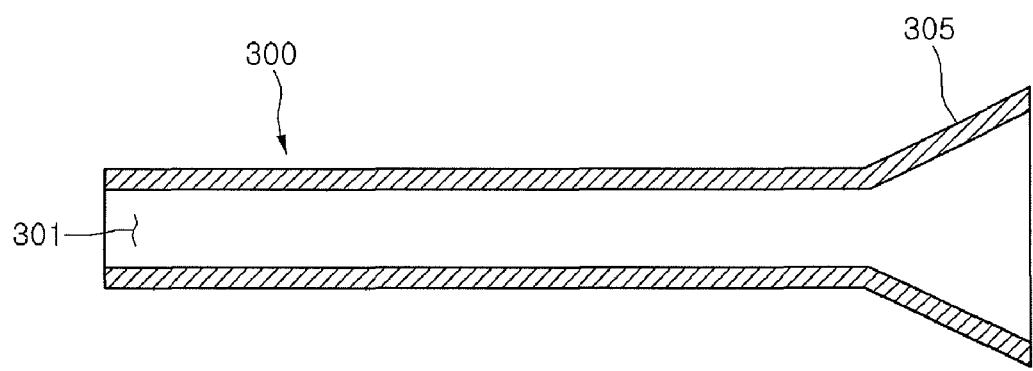

BACKLIGHT UNIT AND LIQUID CRYSTAL DISPLAY DEVICE HAVING THE SAME

CROSS-REFERENCE TO RELATED APPLICATION

This application claims priority under 35 U.S.C. 119 to Korean Patent Application No. 10-2008-0130013, filed on Dec. 19, 2008, which is hereby incorporated by reference in its entirety.

BACKGROUND

1. Field of the Disclosure

This disclosure relates to a backlight unit, and more particularly to a backlight unit which prevents an initial driving malfunction, and a liquid crystal display device having the same.

2. Description of the Related Art

Display devices used for computer monitors or TVs include self-light-emitting devices such as organic light emitting displays (OLEDs), vacuum fluorescent displays (VFDs), field emission displays (FEDs), and plasma display panels (PDPs), as well as non self-light-emitting devices such as liquid crystal displays (LCDs). In general, an LCD device includes two substrates having electric field generation electrodes and a liquid crystal layer having dielectric anisotropy interposed between the substrates. When a certain voltage is applied to the electric field generation electrodes, an electric field is generated in the liquid crystal layer. The strength of the electric field is adjusted by changing the voltage. Thus, a desired image is displayed by controlling the transmissivity of light passing through the liquid crystal layer.

The LCD device includes a data driver, a gate driver, and a backlight unit. The data driver externally receives image data, generates data signals and supplies the generated data signals to data lines on an LCD panel. The gate driver generates a gate signal to drive the pixels of the LCD panel in one line and supplies the generated gate signal to a gate line of the LCD panel. The backlight unit is disposed on the rear surface of the LCD panel and provides light.

Cold cathode fluorescent lamps (CCFLs), external electrode fluorescent lamps (EEFLs), or light emitting diodes (LEDs) are used as the light source in general backlight units. Recently, EEFLs have become popular as the light source of backlight units due to merits such as long lifespan.

If an EEFL included in a direct type backlight unit of a large LCD device is left in the darkness or at a low temperature, gas injected into the EEFL changes into a basic state. As such, the EEFL does not light up when the LCD device is initially driven. In other words, an initial driving malfunction occurs in the EEFL and the backlight unit having the same.

SUMMARY

According to one general aspect of the present embodiment, an LCD device includes: a bottom cover opened upwardly; a reflective sheet disposed in the inner surface of the bottom cover; a plurality of lamps arranged at a fixed interval on the reflective sheet; an auxiliary light source disposed at the outer side surface of the bottom cover; and a light guide member, opposite to the emitting surface of the auxiliary light source, configured to guide light emitted from the auxiliary light source to the lamps through first and second penetration holes formed on one of the side walls of the bottom cover and the reflective sheet.

An LCD device according to another aspect of the present embodiment includes: a liquid crystal display panel; a panel guide configured to support the rear edge of the liquid crystal display panel; a bottom cover opened upwardly and fixed to the panel guide; a reflective sheet disposed in the inner surface of the bottom cover; a plurality of lamps arranged at a fixed interval on the reflective sheet; a driver disposed on the side surface of the panel guide; an auxiliary light source loaded on the driver; and a light guide member, opposite to the emitting surface of the auxiliary light source, configured to guide light emitted from the auxiliary light source to the lamps through first to third penetration holes formed on one of the side walls of the panel guide, the bottom cover and the reflective sheet.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings:

FIG. 4 is a perspective view showing a light guide member according to another embodiment of the present disclosure.

DETAILED DESCRIPTION

Figure 1:
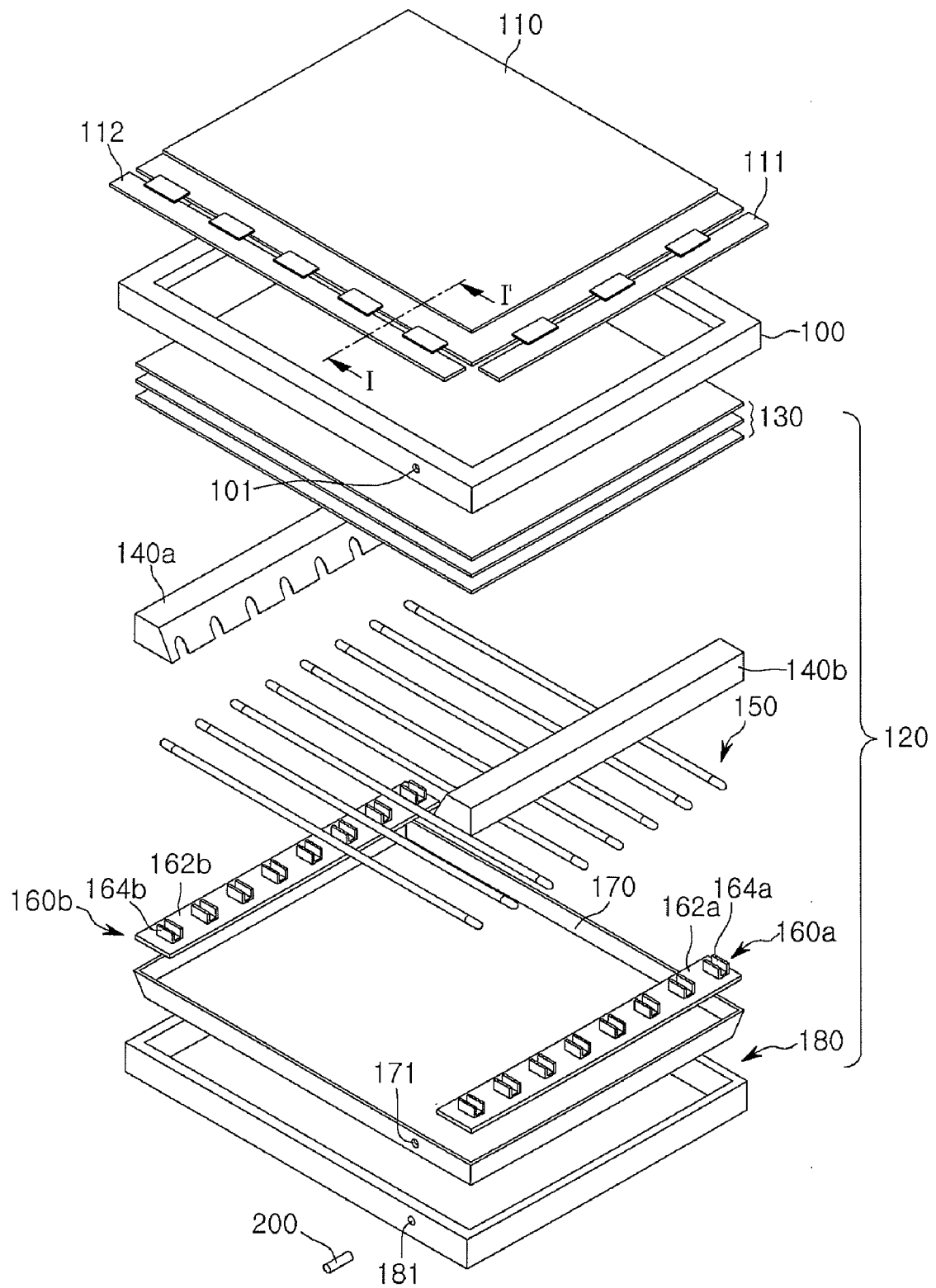
FIG. 1 is an exploded perspective view showing a direct type LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
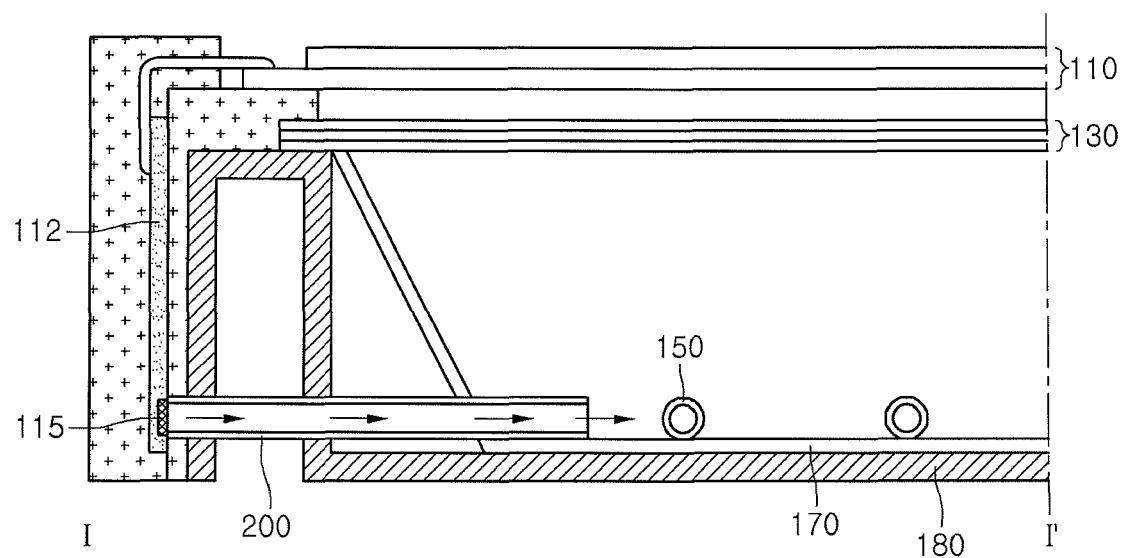
FIG. 2 is a cross-sectional view showing the direct type LCD device taken along the line I-I' shown in FIG. 1.
Figure 3:
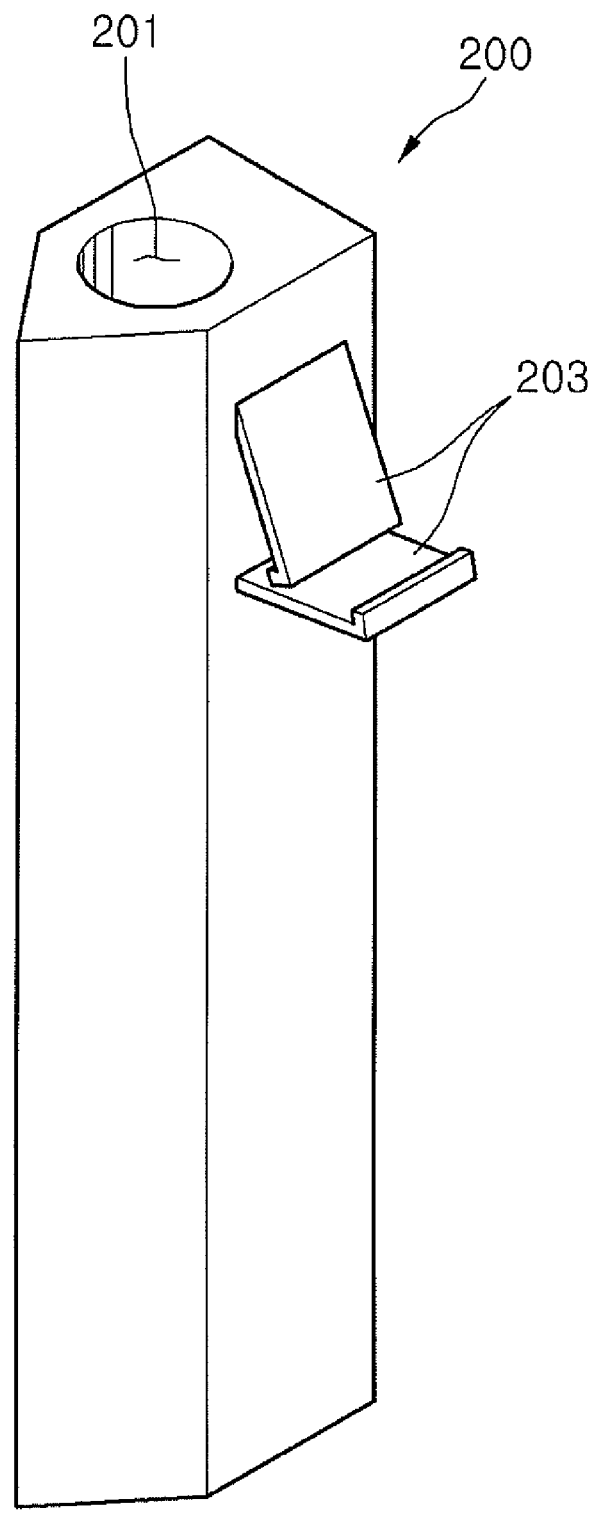
FIG. 3 is a perspective view showing a light guide member according to an embodiment of the present disclosure.

FIG. 1 is an exploded perspective view showing a direct type LCD device according to an embodiment of the present disclosure. FIG. 2 is a cross-sectional view showing the direct type LCD device taken along the line I-I' shown in FIG. 1. FIG. 3 is a perspective view showing a light guide member according to an embodiment of the present disclosure. Referring to FIGS. 1 to 3, an LCD device according to an embodiment of the present disclosure includes an LCD panel 110 for displaying an image as well as a backlight unit 120 disposed on the rear surface of the LCD panel 110 and configured to provide light to the LCD panel 110.

Although it is not shown in detail in the drawings, the LCD panel 110 includes a thin film transistor (TFT) array substrate and a color filter substrate which are combined together to face each other and maintain a uniform cell gap therebetween, as well as a liquid crystal layer interposed between the TFT array substrate and the color filter substrate. The TFT array substrate is defined into pixel regions by a plurality of gate and data lines crossing each other and includes a TFT formed at each intersection of the gate and data lines. The color filter substrate includes a color filter formed in each pixel region, and a black matrix formed opposite the gate and data lines and the TFTs on the edges of the color filters.

A gate driver 111 is provided on one edge of the LCD panel 110 and a data driver 112 is provided on another edge of the LCD panel 110. The gate driver 111 applies a scan signal to the gate line every one horizontal synchronous period so that the TFTs which are connected to the gate line to which the scan signal is applied are turned on/off. The data driver 112 applies data signals to the data lines. The gate driver 111 and the data driver 112 are loaded on printed circuit boards (PCBs) and are electrically connected to the LCD panel 110 by means of tape carrier packages (TCPs).

An auxiliary light source 115 together with a timing controller not shown in the drawings is mounted on the data driver 112. It is preferable for the auxiliary light source 115 to include a light emission diode (LED). The auxiliary light source 115 applies light to a plurality of lamps 150, in order to prevent their initial driving malfunction which can occur due to a change in basic state of the gases contained the plural lamps 150 when the LCD device is left in darkness or at a low temperature.

A panel guide 100 supporting the LCD panel 110 is disposed on the edge of the rear surface of the LCD panel 110. The panel guide 100 is combined with the backlight unit 120. The data driver 112 is disposed on one outer side wall surface of the panel guide 100. A first penetration hole 101 is formed at a region of the outer side wall of the panel guide 100 opposite to the auxiliary light source 115 which is loaded on the data driver 112. The first penetration hole 101 is formed in a size wider than the emitting surface of the auxiliary light source 115.

The backlight unit 120 that provides light to the LCD panel 110 includes: a bottom cover 180 opened upward, a reflective sheet 170, plural lamps 150, and optical sheets 130. The reflective sheet 170 is disposed on the inner surface of the bottom cover 180. The plural lamps 150 are arranged on the reflective sheets 170 and separated from each other at a fixed interval. The optical sheets 130 are disposed over the plural lamps 150, in order to diffuse and converge light.

The backlight unit 120 includes first and second common electrode portions 160a and 160b disposed at both ends of the plural lamps 150, and first and second support sides 140a and 140b disposed at both ends of the plural lamps 150. The first and second common electrode portions 160a and 160b apply a drive signal to the plural lamps 150. To this end, the first common electrode portion 160a includes a first drive PCB 162a, as well as first sockets 164a arranged on the first drive PCB 162a and connected to one end of the plural lamps 150. Similarly, the second common electrode portion 160b also includes a second drive PCB 162b, and second sockets 164b arranged on the second drive PCB 162b and connected to the other end of the plural lamps 150. The first and second support sides 140a and 140b guide light emitted from the lamps 150 to the edge areas of the LCD panel 110 and support the optical sheets 130. The lamps 150 may be CCFLs or EEFLs.

The bottom cover 180 includes a bent side wall on which a second penetration hole 181 is formed opposite the first penetration hole 101. The second penetration hole 181 can be formed penetrating twice though the side wall of the bottom cover 180, because the side wall of the bottom cover 180 is bent.

The reflective sheet 170 opposite to the inner surface of the bottom cover 180 includes inclined side walls in order to reflect light emitted from the lamps 150 to the LCD panel 110. A third penetration hole 171 is formed on one side wall of the reflective sheet 170 opposite to the first and second penetration holes 101 and 181.

The backlight unit 120 according to an embodiment of the present disclosure further includes a light guide member 200 inserted into the first to third penetration holes 101, 181, and 171. However, the backlight unit of the present embodiment is not limited to this. For example, the light guide member 200 can be formed by a structure inserted only into the second and third penetration holes 181 and 171. The light guide member 200 is fastened to the bottom cover 180. Also, the light guide member 200 may be formed of a plastic material or a moldable material. The light guide member 200 guides light emitted from the auxiliary light source 115 to be irradiated on the lamps 150.

The light guide member 200 according to an embodiment of the present disclosure includes a light guide hole 201 penetrating through in a longitude direction, and a fastener 203 provided on one end and fastened to the bottom cover 180. The fastener 203 is formed in a hook structure and fastens the light guide member 200 to the bottom cover 180.

The light guide member 200 is positioned opposite the emitting surface of the auxiliary light source 115, so as to minimize the loss of light emitted from the auxiliary light source 115. More specifically, the auxiliary light source 115 is disposed on one end of the light guide member 200 opposite to its emitting surface and the lamps 150 are arranged side by side on the other end of the light guide member 200. It is preferable for the light guide hole 201 to have a size larger than that of the auxiliary light source 115.

In this manner, the LCD device according to an embodiment of the present disclosure includes the auxiliary light source 115 disposed in the data driver 112 on one inner side surface of the panel guide 100, as well as the light guide member 200 provided to penetrate through the panel guide 100, the bottom cover 180, and the reflective sheet 170 opposite to the emitting surface of the auxiliary light source 115. As such, light emitted from the auxiliary light source 115 is irradiated to the lamps 150. Therefore, the LCD device can prevent the initial lighting malfunction of the lamps in darkness or at a low temperature.

Furthermore, as the initial lighting malfunction of the lamps 150, which occurs when the device is left during a long time in darkness or at a low temperature, is prevented, the LCD device according an embodiment of the present disclosure can improve the display quality at the initial driving.

FIG. 4 is a perspective view showing a light guide member according to another embodiment of the present disclosure. As shown in FIG. 4, a light guide member 300 according to another embodiment of the present disclosure includes a light guide hole 301, a fastener 303, and an expansion portion 305. The light guide hole 301 is formed penetrating through the inner side of the light guide member 300 in a longitude direction. The expansion portion 305 is formed by outwardly expanding one end of the light guide member 300 opposite to the lamps 150 at an inclining angle. One end of the light guide hole, 301 corresponding to the expansion portion 305 has a diameter larger than its other end due to the expansion portion 305 expanding at an incline toward the outer direction of the light guide member 300. The fastener 303 is provided at the other end of the light guide member 300. Similarly to the first embodiment, the fastener 303 is formed in a hook structure and fastens the light guide member 300 to the bottom cover 180.

Such a light guide member 300 according to another embodiment of the present disclosure forces one end of the light guide hole 301 opposite to the lamps 150 to be formed as large as possible. Therefore, light emitted from the auxiliary light source 115 is more widely irradiated on the lamps 150. As a result, the initial driving malfunction of the lamps 150 can be prevented.

As described above, the light guide members 200 and 300 according to the embodiments of the present disclosure enable light emitted from the auxiliary light source 115 to be irradiated on the lamps 150. The lamps 150 can be normally activated at the initial driving, even after being left during a long time in darkness or at a low temperature.

Also, two LCD devices have been described as the embodiments of the present disclosure, but the present disclosure is not limited these. Actually, various modifications and variations are made in the configuration and number of the light guide member which guides light emitted from the auxiliary light source 150 on the side surface of the backlight unit toward the lamps 150. Thus, it is intended that the present disclosure cover the modifications and variations of these embodiments, provided they come within the scope of the appended claims and their equivalents.

What is claimed is:

1. A backlight unit comprising:
a bottom cover opened upwardly;
a reflective sheet disposed in the inner surface of the bottom cover;
a plurality of lamps arranged at a fixed interval on the reflective sheet;
an auxiliary light source disposed at the outer side surface of the bottom cover; and
a light guide member, opposite to the emitting surface of the auxiliary light source, configured to guide light emitted from the auxiliary light source to the lamps through first and second penetration holes formed on one of the side walls of the bottom cover and the reflective sheet,
wherein the light guide member includes a light guide hole formed to penetrate through its inner side in a longitude direction,
wherein the light guide member includes a fastener on one of its ends, formed in a hook structure and fastened to the bottom cover.

2. A liquid crystal display device comprising:
a liquid crystal display panel;
a panel guide configured to support the rear edge of the liquid crystal display panel;
a bottom cover opened upwardly and fixed to the panel guide;
a reflective sheet disposed in the inner surface of the bottom cover;
a plurality of lamps arranged at a fixed interval on the reflective sheet;
a driver disposed on the side surface of the panel guide;
an auxiliary light source loaded on the driver; and
a light guide member, opposite to the emitting surface of the auxiliary light source, configured to guide light emitted from the auxiliary light source to the lamps through first to third penetration holes formed on one of the side walls of the panel guide, the bottom cover and the reflective sheet,
wherein the light guide member includes a light guide hole formed to penetrate through its inner side in a longitude direction,
wherein the light guide member includes a fastener on one of its ends, formed in a hook structure and fastened to the bottom cover.

* * * * *